(12) United States Patent
Baracca et al.

(10) Patent No.: US 11,292,639 B2
(45) Date of Patent: Apr. 5, 2022

(54) SYSTEM FOR SECURING A CASING AND A COVER OF A HOUSING ELEMENT

(71) Applicant: Aktiebolaget SKF, Gothenburg (SE)

(72) Inventors: Fausto Baracca, Massa (IT); Andrea A. Bertolini, Carrara (IT); Fabio Falaschi, Carrara (IT); Pasquale Frezza, Aversa (IT); Alessio Nebbia Colomba, Pisa (IT)

(73) Assignee: AKTIEGOLAGET SKF

( * ) Notice: Subject to any disclaimer, the term of this patent is extended or adjusted under 35 U.S.C. 154(b) by 0 days.

(21) Appl. No.: 16/918,562

(22) Filed: Jul. 1, 2020

(65) Prior Publication Data
US 2021/0009318 A1 Jan. 14, 2021

(30) Foreign Application Priority Data
Jul. 11, 2019 (IT) .......................... 102019000011439

(51) Int. Cl.
| | |
|---|---|
| B65D 41/06 | (2006.01) |
| F16C 35/00 | (2006.01) |
| F16L 55/11 | (2006.01) |
| F16L 55/115 | (2006.01) |
| A47J 47/02 | (2006.01) |
| B65D 1/02 | (2006.01) |

(52) U.S. Cl.
CPC .............. B65D 41/06 (2013.01); F16C 35/00 (2013.01); F16L 55/1155 (2013.01); A47J 47/02 (2013.01); B65D 1/023 (2013.01); B65D 1/0215 (2013.01)

(58) Field of Classification Search
CPC ...... B65D 41/06; B65D 41/04; B65D 1/0246; B65D 1/023; B60K 15/0406; F16C 35/00; F16L 55/1155; F16L 55/1152; F16L 55/115

USPC .................... 220/293, 296, 300, 288; 74/608
See application file for complete search history.

(56) References Cited

U.S. PATENT DOCUMENTS

| 235,279 | A | * | 12/1880 | Norton | ................... B65D 39/10 |
| | | | | | 220/300 |
| 1,947,382 | A | * | 2/1934 | Crowley | ................ B65D 41/04 |
| | | | | | 220/296 |
| 2,202,084 | A | * | 5/1940 | Bourland | ........... B65D 41/0471 |
| | | | | | 220/300 |

(Continued)

FOREIGN PATENT DOCUMENTS

| DE | 19546676 | 6/1997 |
| EP | 3277969 | 2/2018 |

(Continued)

OTHER PUBLICATIONS

Translation of DE19546676A1, Fischer et al., Jun. 19, 1997, p. 4 Lines 6-25 (Year: 1997).*

(Continued)

*Primary Examiner* — Robert J Hicks
(74) *Attorney, Agent, or Firm* — Reed Smith LLP

(57) ABSTRACT

A housing element for food applications having a casing made of metallic material and a cover made of composite material and having a bottom surface which is closed or provided with a through-hole. The housing element is provided with a system for securing the cover on the casing, comprising at least two steps which are formed on the cover and which engage with interference inside at least two corresponding grooves formed on the casing.

11 Claims, 5 Drawing Sheets

(56) References Cited

U.S. PATENT DOCUMENTS 3,036,601 A * 5/1962 Fabian, Jr. .......... F16L 55/1152
138/89
5,201,201 A * 4/1993 Sylvester ................ F16K 35/06
137/382

FOREIGN PATENT DOCUMENTS

GB          1558967 A * 1/1980 .......... F16L 55/1155
WO       2003048595     6/2003

OTHER PUBLICATIONS

International Search Report for corresponding Italy Patent Appln. No. 102019000011439 dated Apr. 9, 2020.

* cited by examiner

SYSTEM FOR SECURING A CASING AND A COVER OF A HOUSING ELEMENT

CROSS REFERENCE TO RELATED APPLICATION

This application is based on and claims priority under 35 U.S.C. § 119 to Italian Application No. 102019000011439, filed Jul. 11, 2019, the entire contents of which are incorporated herein by reference.

FIELD

The exemplary embodiments disclosed herein relate to a housing element for food applications and in particular to the system for securing a casing and a cover of the housing element. In particular, the exemplary embodiments ensure a reliable system for securing a casing made of stainless steel and a cover made of composite material, whether it be of the closed type or open type.

BACKGROUND

In the F&B (Food and Beverages) industry, machines aimed at improving the safety and quality of foods ensure an effective seal between casing and cover of housing elements for food products which are used for processing operations of various kinds and are therefore fixed to a frame of a machine. These housing elements may be made of composite material, typically plastic material, or metallic material, typically stainless steel.

BRIEF DESCRIPTION OF THE DRAWINGS

Various preferred embodiments will now be described with reference to the attached drawings which illustrate some non-limiting examples of embodiment of the sealing system for food applications, in which.

DETAILED DESCRIPTION

In the case of housing elements made of composite material, for example plastic, the exemplary embodiments disclosed herein provide a cover which fixed onto a casing, provides an excellent sealing performance both during extensive tests and in the field.

Exemplary embodiments provide a cover made of composite material joined together not only with casings made of composite material, but also with metal casings, in particular casings made of stainless steel. According to exemplary embodiments, a single terminal cover is used for both variants of casing.

Exemplary embodiments provide a housing element for food applications provided with a system for securing a casing and a cover, where the casing is made of metallic material, in particular stainless steel, and the cover is made of composite material, for example a composite plastic material.

Exemplary embodiments include a housing element having a stainless steel casing with at least two grooves which is joined together with a cover made of composite material and provided with at least two steps. During closure, the steps of the cover engage inside the grooves of the casing and a hermetic seal is ensured by the fact that the joint between steps and grooves is an interference-fit joint.

Preferably, the steps of the cover will be four in number and the grooves of the casing will also be four in number. This ensures a better stability of the joint.

According to exemplary embodiments, the grooves are designed with a symmetrical T shape so that closing of the cover on the casing may be performed by rotating the cover with respect to the casing in both senses of rotation. This characteristic feature is particularly advantageous in the case of an open cover provided with a shaft which, during its rotation, transmits a friction torque to the cover: in such a case it is necessary to ensure that closing of the casing and cover is performed in the same direction as the direction of rotation of the shaft and this is ensured by the possibility of closing the cover on the casing in the desired direction of rotation.

Therefore, according to exemplary embodiments, a housing element is provided with a system for securing a casing made of metallic material and a cover made of composite material. In some exemplary embodiments, the housing element is useful for food applications.

With reference now to the aforementioned figures below, exemplary embodiments are described.

Figure 1:
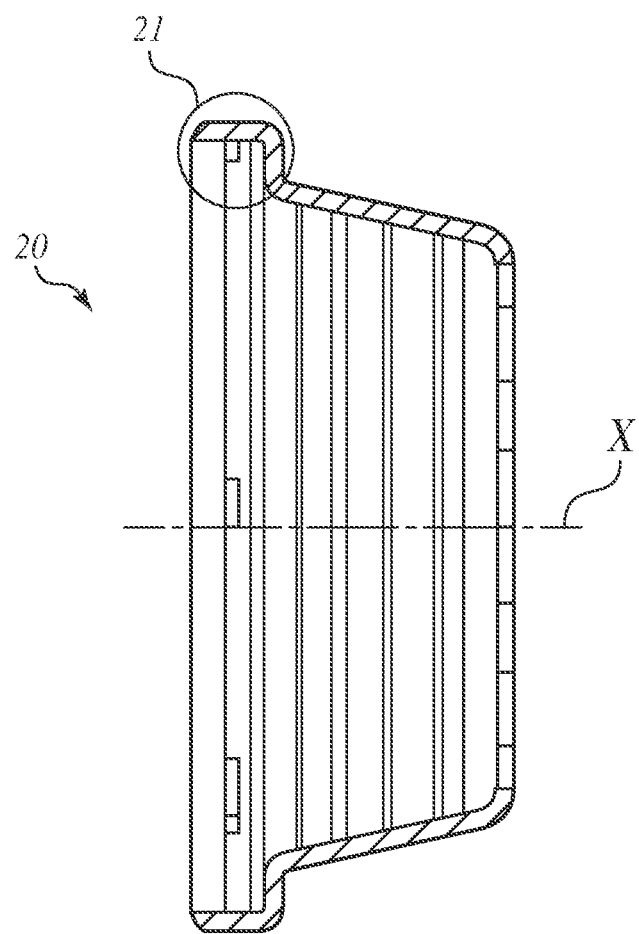
FIG. 1 shows a cross-sectional view of a cover of a housing element for food applications.
Figure 3:
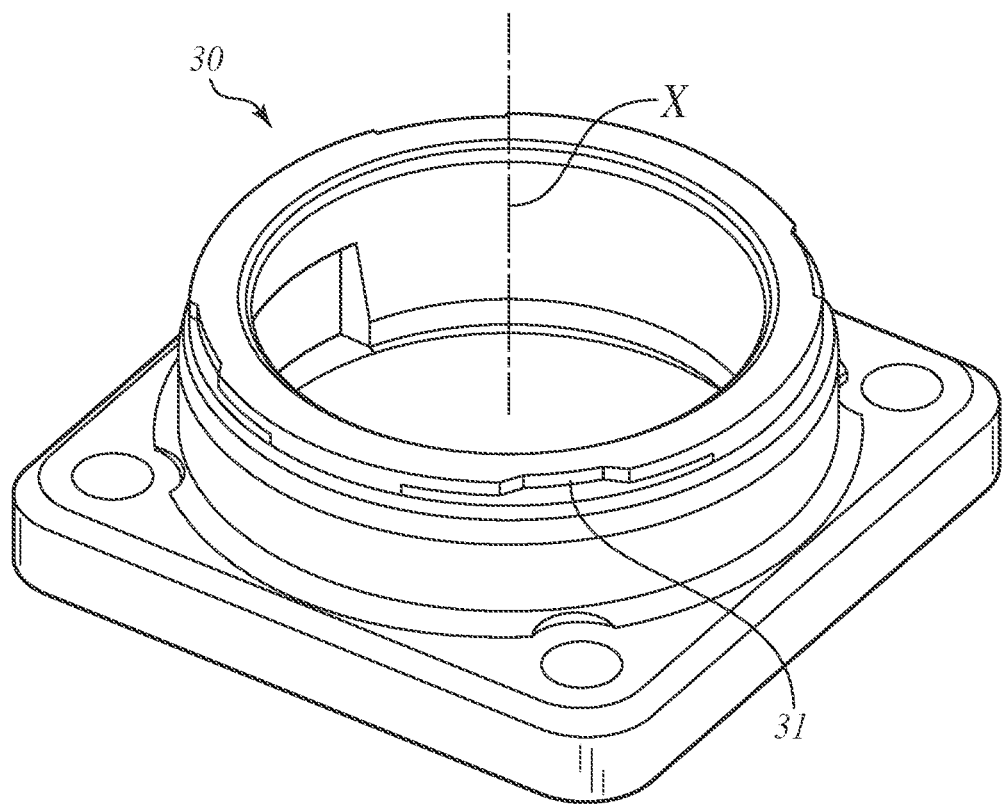
FIG. 3 shows an axonometric view of a casing of the same housing element for food applications.

The housing element 10 (see FIGS. 5 and 6) comprises a casing 30 (FIG. 3) made of metallic material and in particular stainless steel and a cover 20 (FIG. 1) made of composite material, in particular a composite plastic material. This housing element may be used in food applications, for fixing against a machine frame, and, together with a securing system according to exemplary embodiments.

Figure 2:
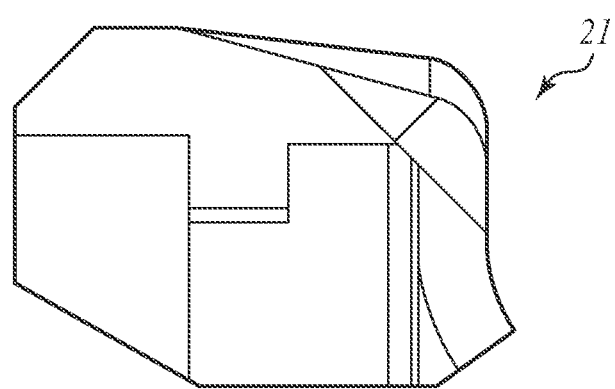
FIG. 2 shows a detail of a step of the cover according to FIG. 1 which forms part of the securing system according to according to an exemplary embodiment.
Figure 4:
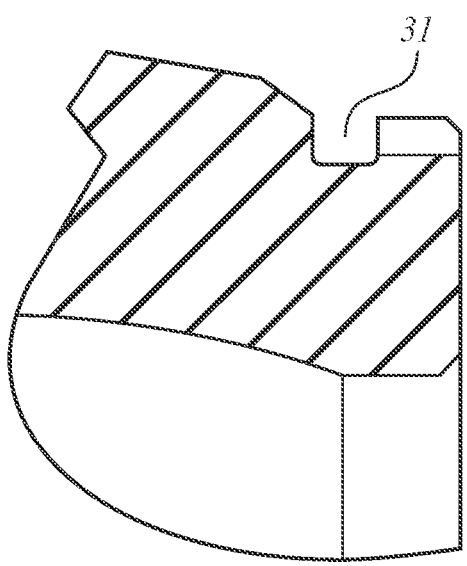
FIG. 4 shows a detail of a groove of the casing according to FIG. 3 which forms part of the securing system according to the embodiment of FIG. 3.
Figure 6:
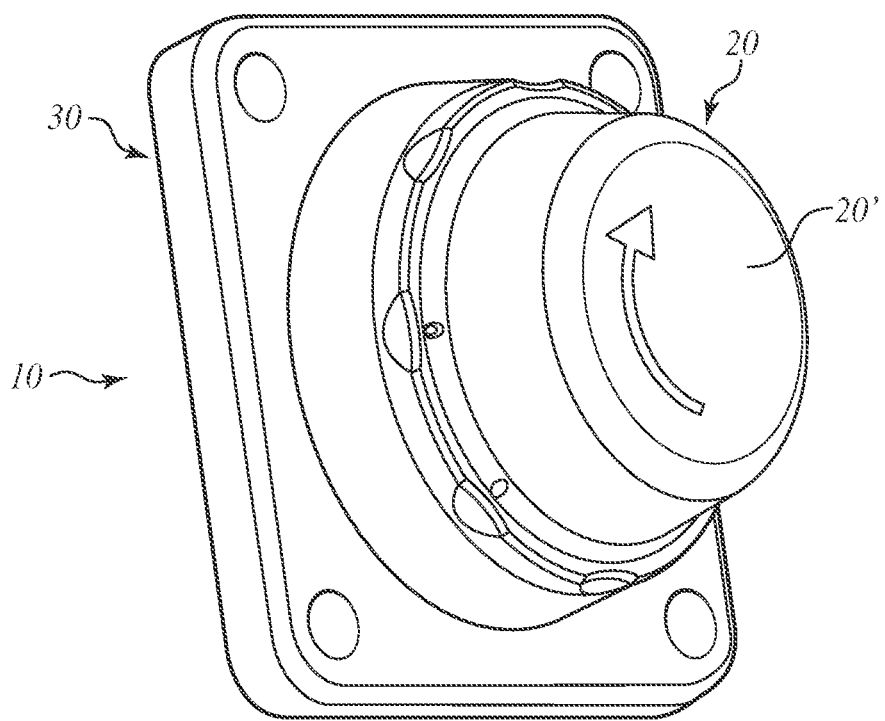
FIG. 6 shows an axonometric view of the cover being closed on the casing.

The cover 20 may have a closed bottom surface 20' (as shown in FIG. 6) or be provided with a through-hole for housing a shaft forming part of the machine with which the housing element 10 is associated. Both components, i.e., casing 30 and cover 20, have an axis X of symmetry which, once the cover has been mounted on the casing, coincides and for this reason has been indicated by the same reference symbol X. The system for securing the housing element 10 comprises at least two steps 21—shown in FIGS. 1 and 2—formed on the cover 20 and at least two grooves 31—visible in FIGS. 3 and 4—formed on the casing 30.

Advantageously, in order to ensure a greater stability of the joint, the steps 21 of the cover 20 will be four in number and the corresponding grooves 31 of the casing 30 will also be four in number.

Figure 5:
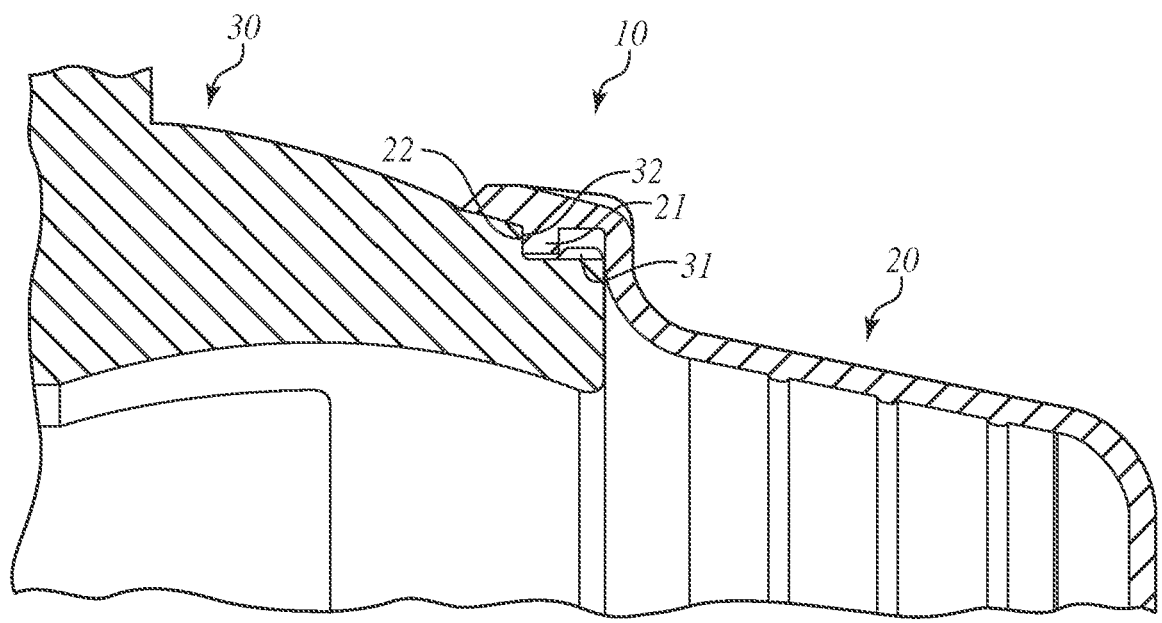
FIG. 5 shows a detail of the system for securing the step of the cover and the groove of the casing.
Figure 7A:
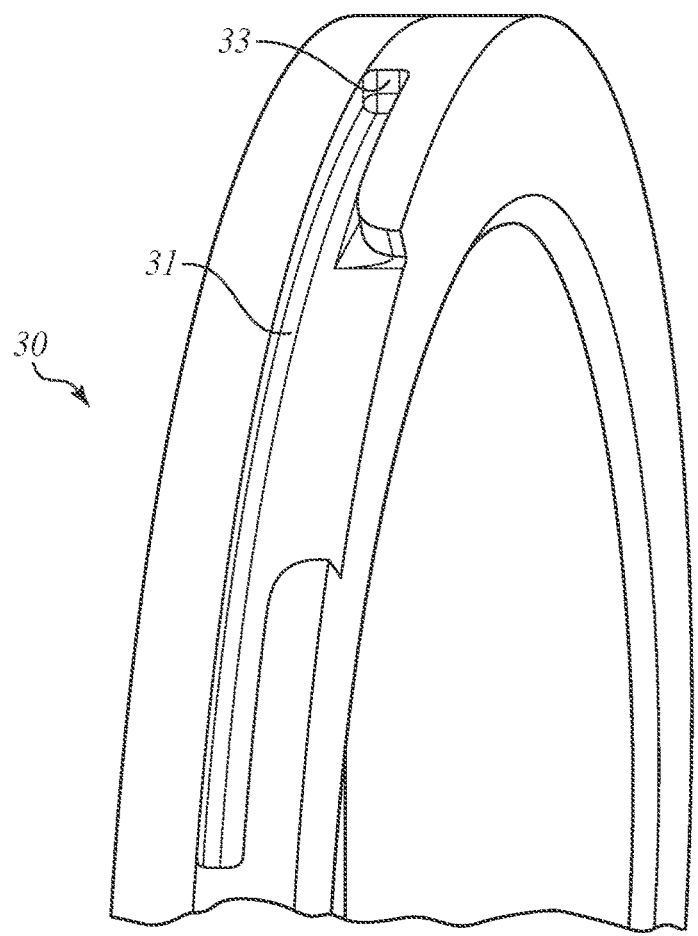
FIG. 7 shows two different details of the groove of the casing (FIG. 7a) and the step of the cover (FIG. 7b) with the respective surfaces which make contact, once the cover has been closed on the casing.
Figure 7B:
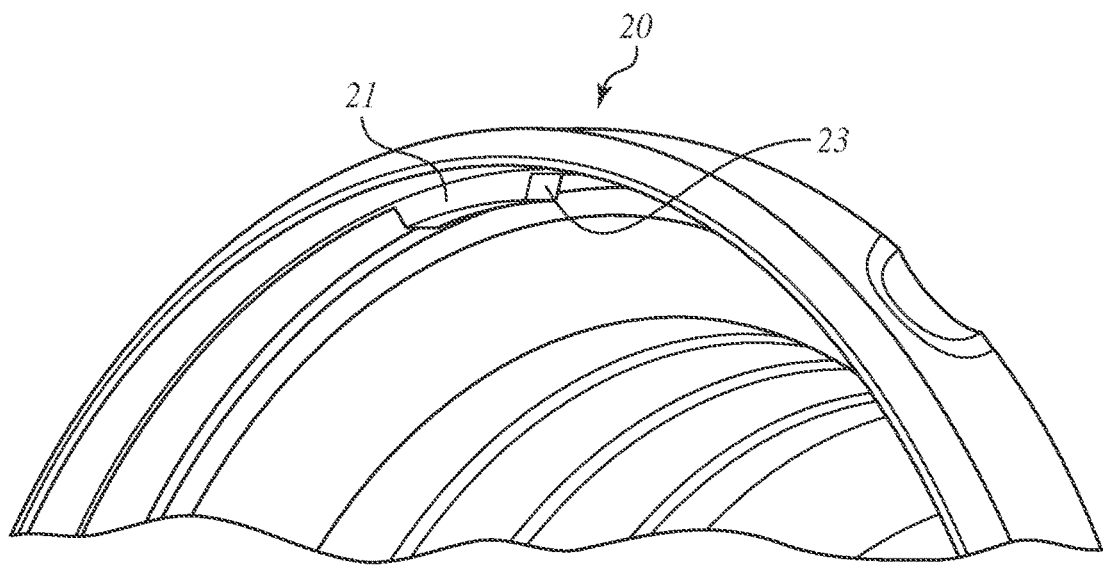

The securing and therefore the closing of the cover 20 on the casing 30 is performed by engaging the steps 21 inside the grooves 31 so that a radially inner surface 32 of the seat of the groove 30 is in contact with the corresponding radially inner surface 22 of the step 21, as shown in FIG. 5. Therefore, as can be seen in FIG. 6, the cover 20 is rotated about the axis X so as to bring the steps 21 inside the corresponding grooves 31. The cover 20 may be rotated until the step 21 comes into contact by means of its side surface 23 (FIG. 7b) with a corresponding side surface 33 (FIG. 7a) of the groove 31.

The nominal dimension of the height of the steps 21 of the cover 20 in the axial direction and the height of the grooves 31 of the casing 30, again in the axial direction, is the same. The tolerance of these dimensions is, however, different so as to create an interference between step and corresponding groove. In this way, the joint is made more stable since it is formed almost always with interference. Preferably, the values of the interference between step width and groove width may vary between −0.05 mm and +0.1 mm This condition does not guarantee entirely that there is always interference, but it should be considered that the probability of all four securing points having a negative interference, and therefore play, and that the cover may come off the casing is very low for the following reasons:

The loads which act on the housing elements are usually radial/axial and not tangential and therefore it is almost impossible that a torque will act on the cover in such a way as to cause it to come off from the casing;

For technical reasons smaller tolerances are difficult to apply and the risk exists that, by adjusting the entire aforementioned range to increasingly positive interference values, closing of the cover will become too difficult under such maximum interference conditions.

The joint is ensured not only by the interference between steps and grooves, but also by the concentricity between cover and casing. Given that the cover is made of plastic material, the latter is easily deformed and it is practically impossible for there to be no interference during the assembly stage. Once assembly has been performed, it is not necessarily the case that all the internal tensions due to the force-fit joint will be "relaxed", but it is very likely that zones where the interference is greater will remain.

Figure 8:
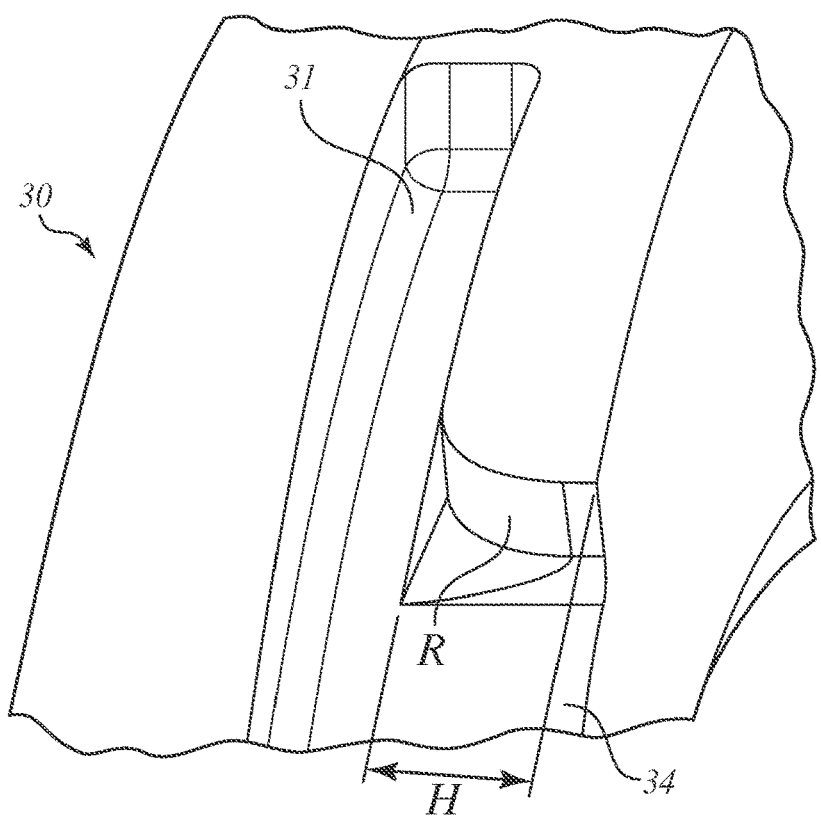
FIG. 8 shows a detail illustrating the connecting radius at the base of the groove of the casing for facilitating insertion of the steps of the cover inside the grooves of the casing.
Figure 9:
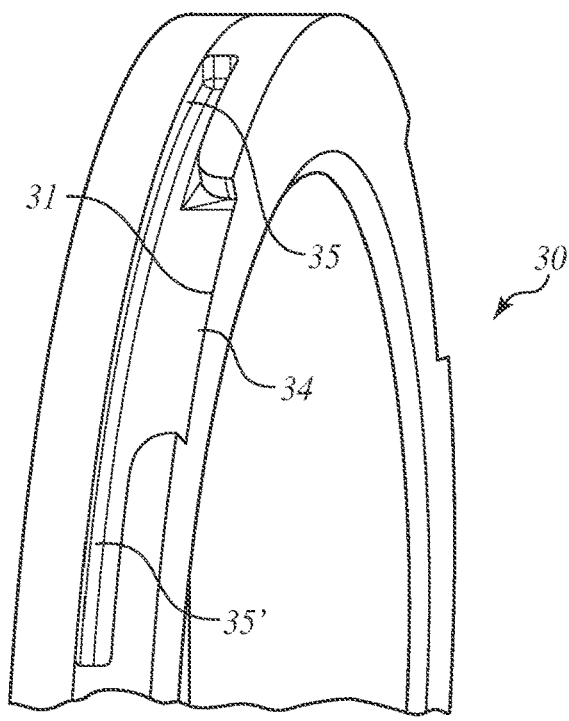
FIG. 9 is a detail of the groove of the casing, showing the symmetry of the groove which is therefore designed to house the steps of the cover in both the directions of rotation in which closing may be performed.

As can be seen in FIG. 9, the groove 31 is T-shaped with a first portion 34 which forms the core thereof and the two further portions 35 and 35' which form the wings thereof. Insertion of the step 21 into the groove 31 is performed as follows: firstly the step 21 engages with the core 34 of the groove 31. Then, by lightly raising the cover 20 and rotating it about its axis X of symmetry in one of the two possible directions of rotation, the step 21, depending on the direction of rotation imparted to the cover, will engage with one of the two wings 35, 35'. Since there is always interference between the dimensions of the step and the corresponding dimensions of the groove, the connecting radius R of the core 34 of the groove 31, shown in FIG. 8, is very important for facilitating insertion of the step 21 inside the groove 31, preventing any jamming of the said step from occurring. Preferably, this connecting radius R must not exceed 50% of the height H of the core 34 of the groove 31. The height H of the core 34 is equal to 2.5 mm and therefore a range for the connecting radius R may be between 0.5 mm and 1 mm.

As can be seen in FIG. 9, the groove 31 has a symmetrical T-shaped form in the sense that the wings 35, 35' are symmetrical with respect to the core 34, namely the width of the wings 35, 35' is the same. This feature allows the cover 20 to be locked by rotating it in either one of the two directions of rotation.

The exemplary embodiments are applicable also to an "open" cover, "open" being understood as meaning that the cover is passed through by a shaft connected to the machinery on which the housing 10 is fixed. In the open version of the cover, a sealing gasket will be arranged between shaft and cover so as to ensure a seal in respect of the exterior. Therefore, a friction torque will be transmitted from the rotation shaft to the seal and therefore to the cover. For the purposes of the exemplary embodiments, this friction torque may release the cover from the casing if the rotation of the shaft occurs in a direction opposite to the direction in which the cover has been rotated in order to be locked onto the casing. For this reason, since the groove 31 has a symmetrical form, it will be possible to rotate and lock the cover in the same direction as the direction of rotation of the shaft; this allows the friction to keep the surface 23 of the cover and surface 33 of the groove (shown in FIG. 7) in contact and prevent any risk of disassembly. In fact, the greater the friction torque, the greater the security with which the "open" cover will be locked onto the casing.

The exemplary embodiments use the same cover made of composite material both for composite material casings and for casings made of metallic material, in particular stainless steel.

The exemplary embodiments provide a symmetrical form of the grooves formed on the casing the cover which may be locked in both senses of rotation Owing to the symmetrical form of the grooves formed on the casing, the "open" cover may also be used, without any risk of disassembly of the cover owing to the friction torque transmitted by the shaft passing through it.

In addition to the exemplary embodiments, as described above, it is to be understood that numerous further variants exist. It must also be understood that said embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

The invention claimed is:

1. A housing element for food applications comprising:
   a casing made of metallic material; and
   a cover made of composite material and having a bottom surface closed or provided with a through-hole,
   wherein said housing element comprises a system for securing the cover on the casing comprising at least two steps which are formed on the cover and which engage with interference inside at least two corresponding grooves formed on the casing;
   wherein the casing is made of stainless steel;
   wherein the interference between the steps of the cover and the corresponding grooves of the casing occurs between the height in the axial direction of the steps and the height in the axial direction of the grooves, the interference value ranging between −0.05 mm and +0.1 mm.

2. The housing element of claim 1, wherein the steps and the corresponding grooves are exactly four in number.

3. A housing element for food applications comprising:
a casing made of metallic material; and
a cover made of composite material and having a bottom surface closed or provided with a through-hole,
wherein said housing element comprises a system for securing the cover on the casing comprising at least two steps which are formed on the cover and which engage with interference inside at least two corresponding grooves formed on the casing;
wherein the casing is made of stainless steel;
wherein the system for securing the cover on the casing is realized so that a radially inner surface of the groove is in contact with a corresponding radially inner surface of the step;
wherein the securing of the cover and casing is also achieved by rotating the cover about an axis (X) of symmetry thereof until the step comes into contact by means of a side surface thereof with a corresponding side surface of the groove;
wherein the groove is T-shaped consisting of a core and two wings symmetrical with respect to the core.

4. The housing element of claim 3, wherein the securing is also achieved by rotating the cover about its axis (X) of symmetry in one of the two possible directions of rotation so that the step, depending on the direction of rotation imparted to the cover, engages with one of the two wings.

5. The housing element of claim 4, wherein the dimension of a connecting radius (R) of the core does not exceed 50% of the height (H) of the core.

6. The housing element of claim 5, wherein the dimension of the connecting radius (R) of the core is between 0.5 mm and 1 mm.

7. A housing element comprising:
a casing made of metallic material and comprising a plurality of grooves; and
a cover made of composite material and having a bottom surface having a plurality of steps that is equal in number with the plurality of grooves, each respective step of the plurality of steps configured to engage with interference inside a respective groove of the plurality of grooves;
wherein each groove of the plurality of grooves is T-shaped consisting of a core and two wings symmetrical with respect to the core.

8. The housing element of claim 7, wherein the bottom surface is either closed or provided with a through-hole.

9. The housing element of claim 7, wherein securing the housing element is also achieved by rotating the cover about its axis of symmetry in either direction of rotation so that each respective step, depending on the direction of rotation imparted to the cover, engages with one of the two wings of the respective groove.

10. A casing made of metallic material and comprising:
a plurality of grooves configured to receive a plurality of steps of a cover in order to secure the cover to the casing, wherein each groove of the plurality of grooves is T-shaped consisting of a core and two wings symmetrical with respect to the core.

11. The casing of claim 10, wherein the T-shaped grooves are configured to receiving cover steps rotationally about its axis of symmetry in either direction of rotation so that each respective step, depending on the direction of rotation imparted to the cover, engages with one of the two wings of the respective groove.

* * * * *